US012693781B1

(12) United States Patent
Zheng et al.

(10) Patent No.: US 12,693,781 B1
(45) Date of Patent: Jul. 28, 2026

(54) OPTIMIZING GARBAGE COLLECTION COPY FORWARD OPERATION BY GENERATING A LIVE INSTANCE TABLE

(71) Applicant: Dell Products L.P., Round Rock, TX (US)

(72) Inventors: Chuanbo Jack Zheng, Cupertino, CA (US); Srikanth Srinivasan, Bangalore (IN); Kao-Feng Hsieh, Taoyuan City (TW)

(73) Assignee: Dell Products L.P., Round Rock, TX (US)

( * ) Notice: Subject to any disclaimer, the term of this patent is extended or adjusted under 35 U.S.C. 154(b) by 52 days.

(21) Appl. No.: 19/036,548

(22) Filed: Jan. 24, 2025

(51) Int. Cl.
*G06F 3/06* (2006.01)
*G06F 12/02* (2006.01)

(52) U.S. Cl.
CPC ............ *G06F 3/0608* (2013.01); *G06F 3/064* (2013.01); *G06F 3/0641* (2013.01); *G06F 3/067* (2013.01); *G06F 12/0261* (2013.01)

(58) Field of Classification Search
CPC ........ G06F 3/0608; G06F 3/064; G06F 3/067; G06F 12/0261; G06F 3/0641
See application file for complete search history.

(56) References Cited

U.S. PATENT DOCUMENTS

| | | | | |
|---|---|---|---|---|
| 10,038,715 | B1 * | 7/2018 | Majkowski | ......... H04L 63/1458 |
| 10,078,583 | B1 * | 9/2018 | Wallace | .............. G06F 11/1453 |
| 10,318,585 | B2 * | 6/2019 | Schatzl | .............. G06F 12/0269 |
| 10,430,384 | B1 * | 10/2019 | Desai | .................... G06F 16/182 |
| 10,496,283 | B2 | 12/2019 | Waghulde | |
| 10,592,353 | B2 | 3/2020 | Martin et al. | |
| 11,593,332 | B1 | 2/2023 | Shilane et al. | |
| 2014/0101113 | A1 * | 4/2014 | Zhang | ................. H04L 67/5681 |
| | | | | 707/E17.002 |
| 2020/0341891 | A1 * | 10/2020 | Shilane | ................... G06F 3/067 |

* cited by examiner

*Primary Examiner* — Larry T Mackall
(74) *Attorney, Agent, or Firm* — Chamberlain, Hrdlicka, White, Williams & Aughtry; Aly Z. Dossa

(57) ABSTRACT

A method for managing a garbage collection operation includes: generating a live filter using an L1 table; iterating an index table to obtain fingerprints (FPs) of LO segments and container identifiers (CIDs) associated with the FPs; generating a live instance table based on the index table and the live filter; iterating the live instance table to count the active FPs for each CID; identifying, based on a reference table, a first container that has a low-liveness state and a second container that has a high-liveness state; assigning the first container to a batch; identifying FPs of the LO segments associated with each CID in the batch; obtaining metadata of each CID in the batch; generating a bitmap based on the hash table and metadata; identifying a set of live compression regions (CRs); and deleting containers of inactive LO segments as part of the operation.

20 Claims, 7 Drawing Sheets

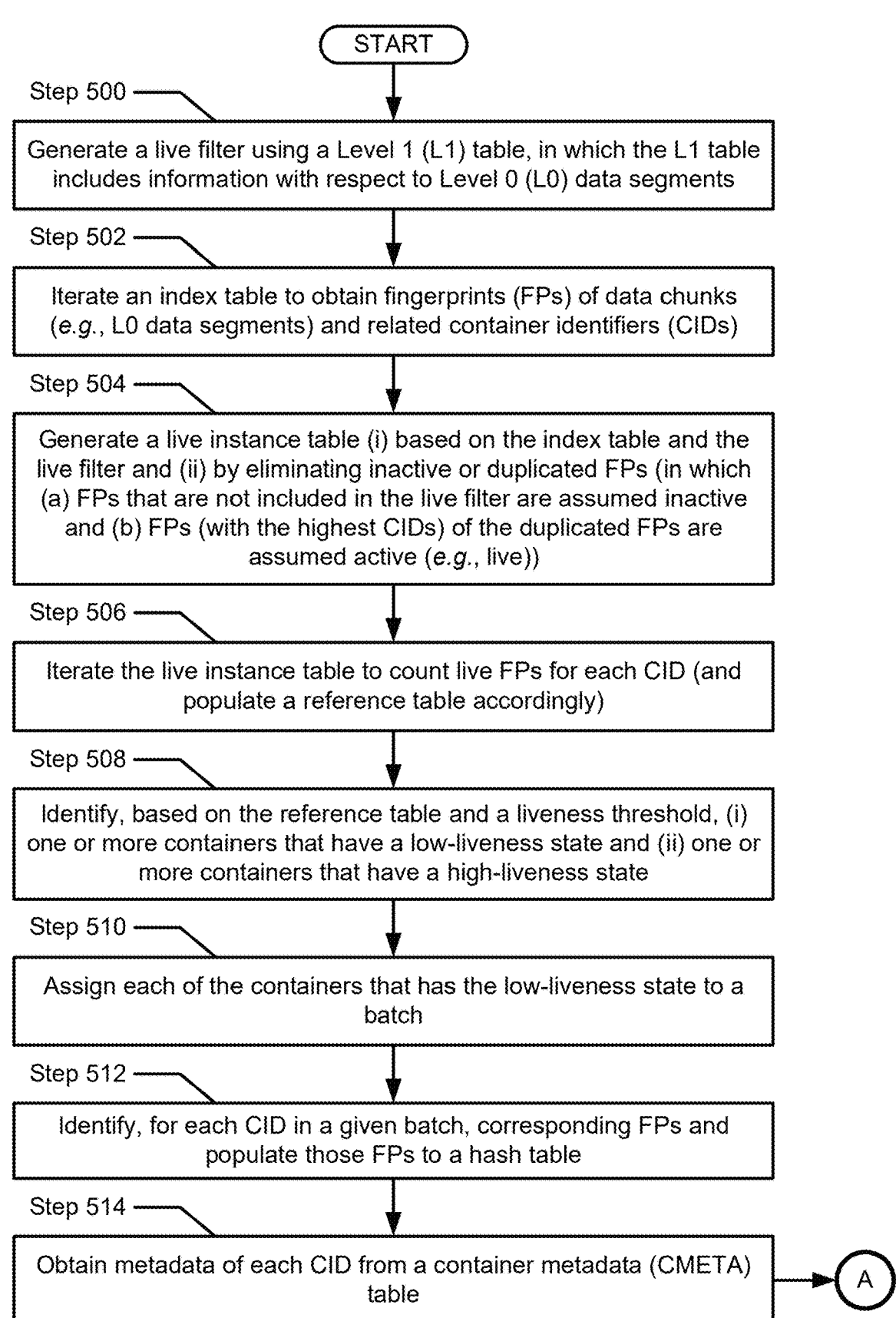

Step 500 — Generate a live filter using a Level 1 (L1) table, in which the L1 table includes information with respect to Level 0 (L0) data segments Step 502 — Iterate an index table to obtain fingerprints (FPs) of data chunks (e.g., L0 data segments) and related container identifiers (CIDs)

Step 504 — Generate a live instance table (i) based on the index table and the live filter and (ii) by eliminating inactive or duplicated FPs (in which (a) FPs that are not included in the live filter are assumed inactive and (b) FPs (with the highest CIDs) of the duplicated FPs are assumed active (e.g., live))

Step 506 — Iterate the live instance table to count live FPs for each CID (and populate a reference table accordingly)

Step 508 — Identify, based on the reference table and a liveness threshold, (i) one or more containers that have a low-liveness state and (ii) one or more containers that have a high-liveness state Step 510 — Assign each of the containers that has the low-liveness state to a batch Step 512 — Identify, for each CID in a given batch, corresponding FPs and populate those FPs to a hash table Step 514 — Obtain metadata of each CID from a container metadata (CMETA) table

OPTIMIZING GARBAGE COLLECTION COPY FORWARD OPERATION BY GENERATING A LIVE INSTANCE TABLE

BACKGROUND

Devices are often capable of performing certain functionalities that other devices are not configured to perform or are not capable of performing. In such scenarios, it may be desirable to adapt one or more systems to enhance the functionalities of devices that cannot perform those functionalities.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example and are not meant to limit the scope of the claims.

DETAILED DESCRIPTION

Figure 1:
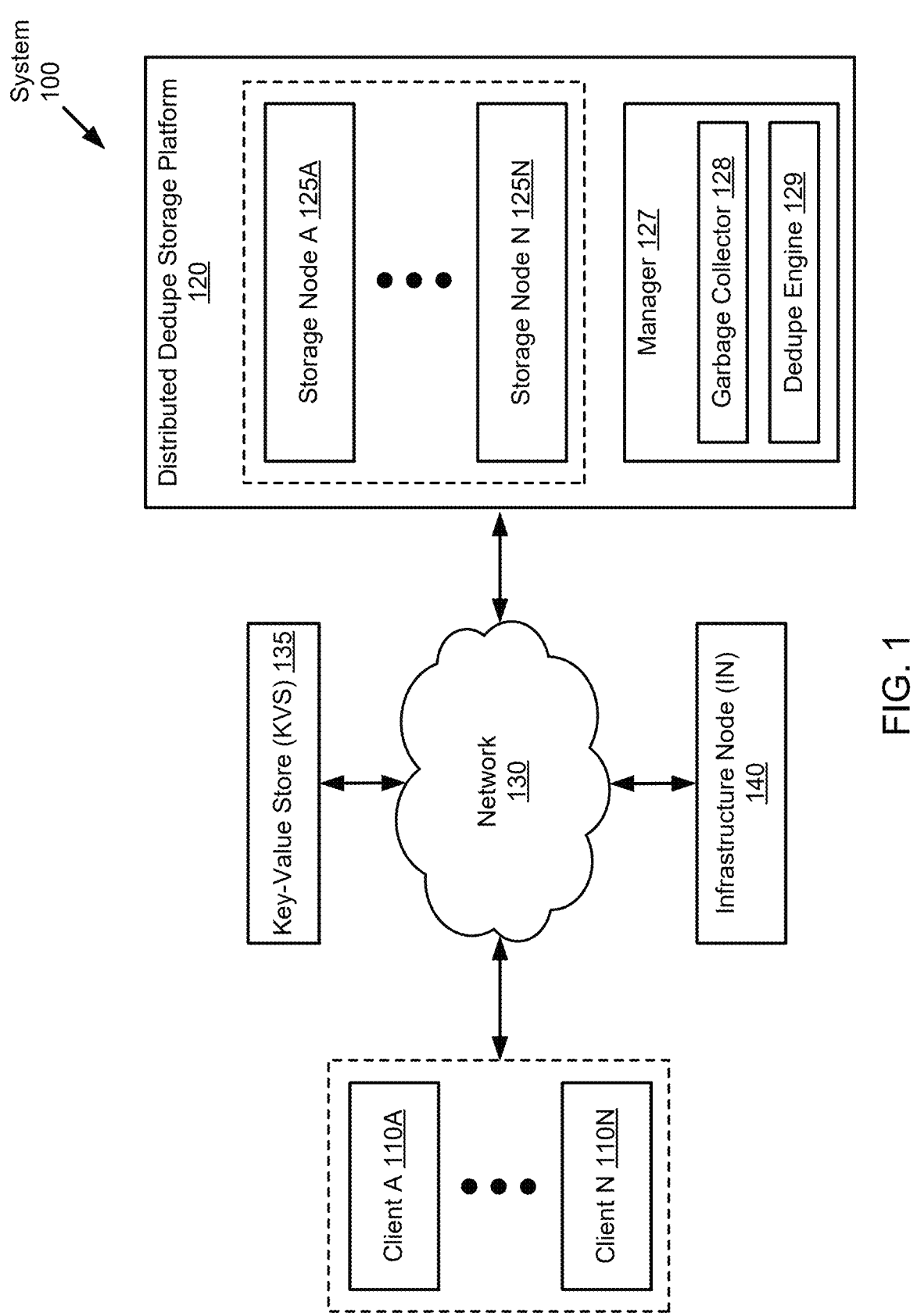
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, distributed dedupe storage systems partition data into separate deduplication domains with similarity groups ("simgroups"). To recycle/free the storage space occupied by dead/inactive and/or duplicated data segments (e.g., data chunks), including, for example, expired backup data, a separate garbage collection function/operation may need to be executed for the data on each of the simgroups. With large number of simgroups, this operation may take long time and, to increase the overall performance of a related storage system, more concurrent garbage collection operations/processes may need to be executed for multiple simgroups.

Traditional garbage collection models/algorithms employ two large in-memory filters (for data segment cleaning): a live filter and a live instance filter, which can be a Bloom filter or a Quotient filter (e.g., a probabilistic data structure used for an efficient membership testing, in which, unlike a Bloom filter, two or more Quotient filters can be merged to form a single Quotient filter without impacting its false positive ratio). A live filter/vector may track one or more live data segments in a given storage system (e.g., data segments that are being referenced (or being used) by a file system of the storage system) and a live instance filter/vector may be used to filter duplicated live segments to keep/retain only the one with the highest container identifier (CID) (e.g., to keep the latest segments for a better locality), in which the live instance filter may only be needed to perform a copy phase (of a corresponding garbage collection operation) and the live filter may be released once the live instance filter is ready to use.

Further, in most cases, the usage of a live instance filter may be faced with memory limits. For example, when multiple concurrent processes are needed to accelerate performance of a garbage collection operation, the total memory required (to perform these processes) can be excessive to manage for a related storage system/platform. As yet another example, simgroups can be unevenly balanced (across a related storage system), which may lead to one of the simgroups to hold more data than its default sizing (and, as a result, the live instance filter associated with this simgroup may not be fit in memory). As yet another example, ingested data may trigger a segment revival/resurrection operation for one or more simgroups (that are related to a garbage collection operation), in which this operation may consume excessive memory and temporary storage (of a related storage system). As yet another example, for hyperscale applications or when a storage system is being executed on a cloud, the amount of data can become huge and this data may not fit in the memory available to perform a garbage collection operation (because, for example, the memory in the cloud may come at a cost that should be limited).

For at least the reasons discussed above and without requiring resource-intensive efforts (e.g., time, engineering, etc.), a fundamentally different approach/framework is needed (e.g., an approach for storage systems (especially for distributed dedupe storage systems) to (i) eliminate the need for in-memory live instance filter by using a live instance table (e.g., a table with segment fingerprints and container identifiers) that is hosted by a KVS (e.g., an on-disk KVS that is part of a corresponding storage platform) and (ii) minimize (or significantly reduce) the overall memory used in the storage platform while performing a related garbage collection operation).

Embodiments disclosed herein relate to methods and systems to manage a garbage collection operation in a storage system/platform. As a result of the processes discussed below, one or more embodiments disclosed herein advantageously ensure that: (i) a garbage collection operation is performed using a live instance table (hosted by a KVS); (ii) a live filter is only needed until the live instance table is generated/built and can be freed up once the live instance table is generated (e.g., by the manager and stored in the KVS); (iii) with the help of (ii), the memory footprint used for garbage collection is significantly reduced (e.g., to perform a copy forward operation) and memory availability across the storage platform is significantly increased (e.g. to process storage data for a better user experience); and/or (iv) before performing the copy forward operation, a period of time required to replay one or more revived segments to the live instance filter is got rid of.

The following describes various embodiments disclosed herein.

FIG. 1 shows a diagram of a system (100) in accordance with one or more embodiments disclosed herein. The system (100) includes any number of clients (e.g., Client A (110A), Client N (110N), etc.), a KVS (135), an infrastructure node (IN) (140), a distributed dedupe storage platform (120), and a network (130). The system (100) may include additional, fewer, and/or different components without departing from the scope of the embodiments disclosed herein. Each component may be operably/operatively connected to any of the other components via any combination of wired and/or wireless connections. Each component illustrated in FIG. 1 is discussed below.

In one or more embodiments, the clients (e.g., 110A, 110N, etc.), the KVS (135), the IN (140), the distributed dedupe storage platform (120), and the network (130) may be (or may include) physical hardware or logical devices, as discussed below. While FIG. 1 shows a specific configuration of the system (100), other configurations may be used without departing from the scope of the embodiments disclosed herein. For example, although the clients (e.g., 110A, 110N, etc.) and the IN (140) are shown to be operatively connected through a communication network (e.g., 130), the clients (e.g., 110A, 110N, etc.) and the IN (140) may be directly connected (e.g., without an intervening communication network).

Further, the functioning of the clients (e.g., 110A, 110N, etc.) and the IN (140) is not dependent upon the functioning and/or existence of the other components (e.g., devices) in the system (100). Rather, the clients and the IN may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, data deduplication performed by a manager (127) of the storage platform (120), etc.), storage capacity (e.g., to store encrypted data across storage nodes (e.g., 125A, 125N, etc.) of the storage platform (120)), and data protection (e.g., software-defined data protection, disaster recovery, etc.) as a service to users (e.g., people) of clients (e.g., 110A, 110N, etc.). For example, the system may be configured to organize unbounded, continuously generated data into a data stream. The system (100) may also represent a comprehensive middleware layer executing on computing devices (e.g., 600, FIG. 6) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using the IN (140)) from the users. By doing so, the users may utilize different computing devices (e.g., 600, FIG. 6) that have different quantities of computing resources (e.g., processing cycles, memory, storage, etc.) while still being afforded consistent user experience. For example, by performing some computations remotely, the system (100) (*i*) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as a universal serial bus (USB) device), etc.

In one or more embodiments, a client (e.g., 110A, 110N, etc.) may include functionality to, e.g.: (i) capture sensory input (e.g., sensor data) in the form of text, audio, video, touch or motion, (ii) collect massive amounts of data at the edge of an Internet of Things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the IN (140)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to the IN (140). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene/environment), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may represent a physical appliance or a computing device operated by one or more individuals of (or employed by) an organization. Examples of said individual(s) may include, but not limited to, any organization executive(s) (e.g., chief executive officer (CEO), chief financial officer (CFO), etc.), and any employee(s) in the accounting/finance team of the organization (e.g., a collector person). Further, the organization may refer to any enterprise at least engaged in for-profit commercial, industrial, or professional activities.

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with the IN (140) and/or the distributed dedupe storage platform (120). For example, the clients may issue requests to the IN to receive responses and interact with various components of the IN. The clients may also request data from and/or send data to the IN (for example, the clients may transmit information to the IN that allows the IN to perform computations, the results of which are used by the clients to provide services to the users). As yet another example, the clients may utilize computer-implemented services provided by the IN. When the clients interact with the IN, data that is relevant to the clients may be stored (temporarily or permanently) in the IN.

In one or more embodiments, a client (e.g., 110A, 110N, etc.) may be capable of, e.g.: (i) collecting users' inputs, (ii) correlating collected users' inputs to the computer-implemented services to be provided to the users, (iii) communicating with the IN (140) and/or the distributed dedupe storage platform (120) that perform computations necessary to provide the computer-implemented services, (iv) using the computations performed by, for example, the IN to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the IN (140), the distributed dedupe storage platform (120), etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be considered without departing from the scope of the embodiments disclosed herein.

Figure 6:
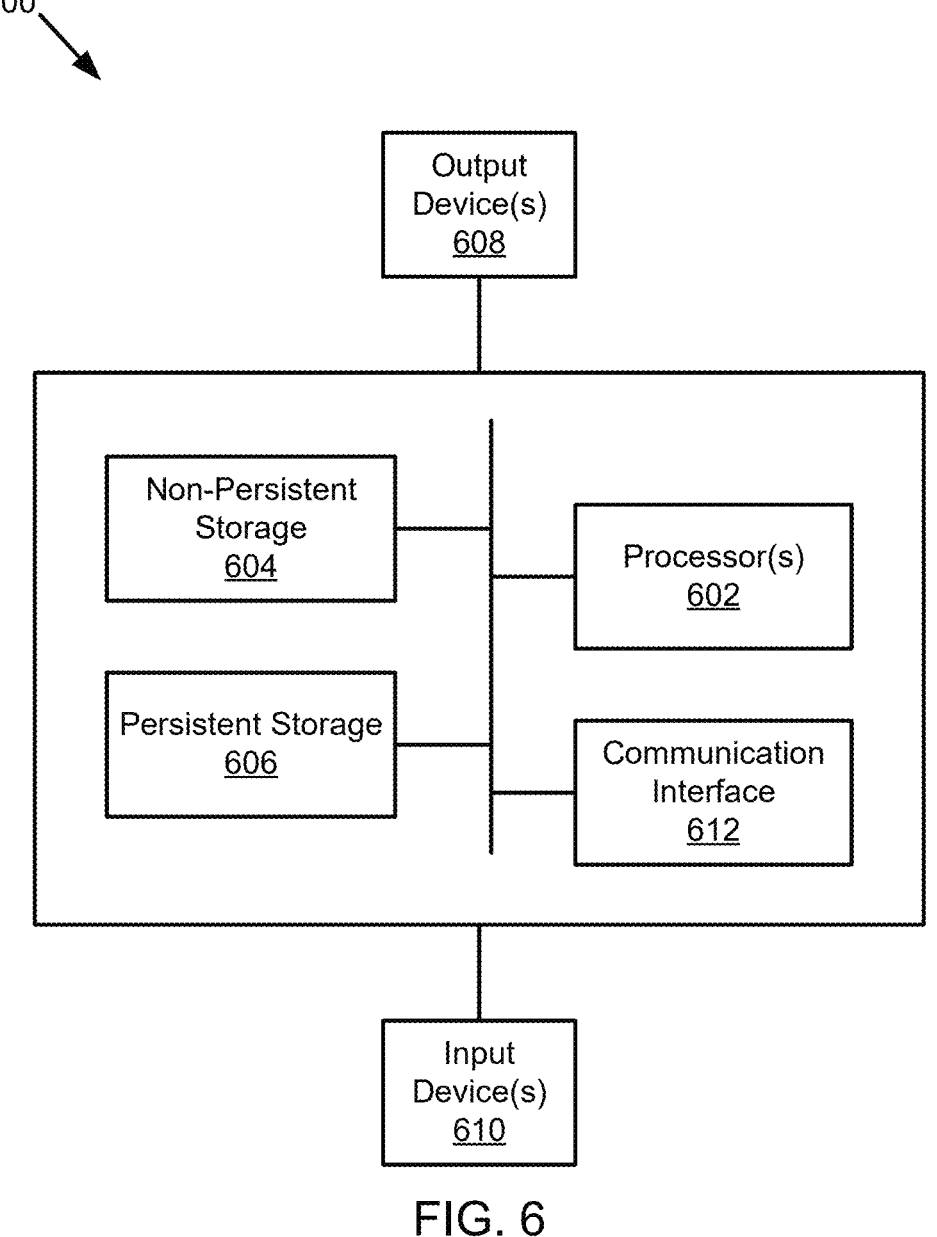
FIG. 6 shows a diagram of a computing device in accordance with one or more embodiments disclosed herein.

Further, in one or more embodiments, a client (e.g., 110A, 110N, etc.) may be implemented as a computing device (e.g., 600, FIG. 6). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., customers, administrators, organization executives, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing virtualization technology. In one or more embodiments, an administrator may be a user with permission (e.g., a user that has root-level access) to make changes to the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 600, FIG. 6) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the IN (140) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (140) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the distributed dedupe storage platform (120) for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or machine learning (ML) models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN (not shown) for review and/or other human interactions; (x) exchange data with other devices registered in/to the network (130) in order to, for example, participate in a collaborative workload placement (e.g., the node may split up a request (e.g., an operation, a task, an activity, etc.) with another IN, coordinating its efforts to complete the request more efficiently than if the IN had been responsible for completing the request); (xi) provide (in conjunction with the distributed dedupe storage platform (120)) software-defined data protection for the clients (e.g., 110A, 110N, etc.); (xii) provide (in conjunction with the distributed dedupe storage platform (120)) automated data discovery, protection, management, and recovery operations for the clients; (xiii) monitor operational states of the clients; (xiv) regularly back up configuration information of the clients to the distributed dedupe storage platform (120); (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the clients and/or distributed dedupe storage platform; (xvii) provide data deduplication (in conjunction with the distributed dedupe storage platform (120)); (xviii) orchestrate (in conjunction with the distributed dedupe storage platform (120)) data protection through one or more GUIs; (xix) empower data owners (e.g., users of the clients) to perform self-service data backup and restore operations from their native applications (in conjunction with the distributed dedupe storage platform (120)); (xx) ensure compliance and satisfy different types of service level objectives (SLOs) set by an administrator/user; (xxi) increase (in conjunction with the distributed dedupe storage platform (120)) resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., an IN may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IN (140) may communicate with, for example, the distributed dedupe storage platform (120) and/or other storage devices in the system (100).

As described above, the IN (140) may be capable of providing a range of functionalities/services to the users of the clients (e.g., 110A, 110N, etc.). However, not all users may be allowed to receive all the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services. For example, the priority (e.g., the user access level) of a user may be used to determine how to manage computing resources of the IN (140) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (140) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (140) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

As used herein, a "policy" is a collection of information, such as a backup policy or other data protection policy, that includes, for example (but not limited to): identity of source data that is to be protected, backup schedule and retention requirements for backed up source data, identity of a service level agreement (SLA) (or a rule) that applies to source data, identity of a target device where source data is to be stored, etc.

As used herein, the term "backup" is intended to be broad in scope. In this manner, example backups in connection with which embodiments disclosed herein may be employed include (but not limited to): full backups, partial backups, clones, snapshots, incremental backups, differential backups, etc.

As used herein, a "rule" is a guideline used by an SLA component to select a particular target device (or target devices), based on the ability of the target device to meet requirements imposed by the SLA. For example, a rule may specify that an HDD having a particular performance parameter should be used as the target device. A target device selected by the SLA component may be identified as part of a backup policy or other data protection policy.

As used herein, an "SLA" between, for example, a vendor and a user may specify one or more user performance requirements (that define, for example, a target device to be chosen dynamically during, and as part of, a data protection process), for example (but not limited to): how many copies should be made of source data, latency requirements, data availability requirements, recovery point objective (RPO) requirements, recovery time objective (RTO) requirements, etc. In most cases, the user may be agnostic as to which particular target devices are used, as long as the user performance requirements are satisfied.

In one or more embodiments, data protection policies used to protect massive amounts of data may require a certain level of intelligence to infer SLAs of a user and provide ease of implementing data protection by reducing manual effort as much as possible to meet user expectations (or user demands). Further, a data protection policy may be defined and implemented to determine target device(s) that are best suited to meet user SLAs (that are defined within the policy). In some cases, user SLAs may be assigned to particular data protection policies for different types of data protection workloads.

As used herein, a "container" is an executable unit of software in which an application code is packaged, along with its libraries and dependencies, so that it can be executed anywhere. To do this, a container takes advantage of a form of OS virtualization in which features of the OS are leveraged to both isolate processes and control the portion of a CPU, memory, and a disk that those processes have access to.

As used herein, a "file system" is a method that an OS (e.g., Microsoft® Windows, Apple® MacOS, etc.) is used to control how data is named, stored, and retrieved. For example, once a user has logged into a computing device (e.g., 600, FIG. 6), the OS of that computing device uses the file system (e.g., new technology file system (NTFS), a resilient file system (ReFS), a third extended file system (ext3), etc.) of that computing device to retrieve one or more applications to start performing one or more operations (e.g., functions, tasks, activities, jobs, etc.). As yet another example, a file system may divide a volume (e.g., a logical drive) into a fixed group of bytes to generate one or more blocks of the volume.

As used herein, a "volume" may be analogous to a logical unit number in a storage area network (SAN), in which a volume may be a subset of the distributed dedupe storage platform's (120) capacity presented by a storage node (e.g., 125A, 125N, etc.) as a local block device. A volume's data may be evenly distributed across all storage resources of the distributed dedupe storage platform (120), for example, according to a data layout selected for the distributed dedupe storage platform (120).

Further, while a single IN (e.g., 140) is considered above, the term "node" includes any collection of systems or sub-systems that individually or jointly execute a set, or multiple sets, of instructions to provide one or more computer-implemented services. For example, a single IN/server/host may provide a computer-implemented service on its own (i.e., independently) while multiple other nodes may provide a second computer-implemented service cooperatively (e.g., each of the multiple other nodes may provide similar and or different services that form the cooperatively provided service).

As described above, the IN (140) may provide any quantity and any type of computer-implemented services. To provide computer-implemented services, the IN may be a heterogeneous set, including a collection of physical components/resources (discussed above) configured to perform operations of the node and/or otherwise execute a collection of logical components/resources (discussed above) of the node.

In one or more embodiments, the IN (140) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

One of ordinary skill will appreciate that the IN (140) may perform other functionalities without departing from the scope of the embodiments disclosed herein.

In one or more embodiments, the IN (140) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110N, etc.), the IN (140) may also be implemented as a logical device.

In the embodiments of the present disclosure, the KVS (135) (e.g., a key-value database) is demonstrated as a separate entity from the distributed dedupe storage platform (120); however, embodiments disclosed herein are not limited as such. The KVS (135) may be demonstrated as part of the distributed dedupe storage platform (e.g., as deployed to the platform, a sub-component within the platform, an on-disk KVS that is part of distributed dedupe storage platform, etc.).

In one or more embodiments, users (e.g., customers, administrators, people, etc.) and/or the distributed dedupe storage platform (120) may utilize the KVS (135) (for example, as an external/remote key-value manager) to generate, store, transmit, and/or delete keys (e.g., to perform key related operations) because (i) an external key-value manager may be more secure (which makes it much harder to covertly discover cryptographic keys) for generating, storing, transmitting, and/or deleting (e.g., forgetting, discarding, etc.) cryptographic keys than a data storage system and (ii) an external key-value manager is typically a fairly simple, self-contained system that is not downloading potentially malicious applications (e.g., software).

In one or more embodiments, the KVS (135) may refer to a data storage method that stores objects (or data structures) (e.g., a live instance table (see FIG. 4), container metadata (see FIG. 3), metadata segments, application deployment information, API calls used to extract application deployment information, etc.) and associated keys. The keys may refer to hashes, numbers, and/or identifiers, which may be associated with particular objects stored to the KVS (135). In one or more embodiments, one or more keys may be used to quickly retrieve one or more objects (e.g., values associated with the keys) stored to the KVS (135).

In one or more embodiments, as being an external cryptographic key-value manager (remote to the distributed dedupe storage platform (120)), the KVS (135) may include a random number generator to generate cryptographic keys (e.g., encryption keys, decryption keys, etc.) for use (i) in encrypting data items for storage in a storage node (e.g., 125A, 125N, etc.) or (ii) in decrypting data items for retrieval from the corresponding drive of a storage node.

As described above, the KVS (135) may generate, store, transmit, and/or delete one or more keys for one or more volumes/drives of a storage node (e.g., 125A, 125N, etc.). Each key stored on the KVS (135) may be associated with a particular volume (e.g., a per-logical-volume key). In one or more embodiments, the KVS (135) may store a single key, as well as two or more keys (in which a second key may be generated by a KVS (not shown) and transmitted to the KVS (135) for storage). The KVS (135) may also store one or more keys for each volume. In other words, the distributed dedupe storage platform (120) may store multiple keys for a volume on the KVS (135) (which is coupled to the distributed dedupe storage platform (120)).

As used herein, "data item" is intended to be broadly construed to encompass, for example, a block, a chunk, file, object, or other grouping of data suitable for storage in the distributed dedupe storage platform (120).

As used herein, "encryption" (e.g., a symmetric or asymmetric encryption) is the process of encoding data based on a cryptographic key (e.g., the process of applying a model to a data chunk (e.g., a segment) using an encryption key to generate an encrypted data chunk). In this manner, only an authorized user/party having the appropriate cryptographic key is able to decrypt the data. An unauthorized user/party intercepting the encrypted data is unable to read or utilize the encoded data without the appropriate key. In one or more embodiments, a data encryption/decryption operation may be performed according to different cryptographic modes/models, for example (but not limited to): a cipher block chaining (CBC) mode, a ciphertext stealing (XTS) mode, a Galois/Counter Mode (GCM), etc.

In one or more embodiments, the KVS (135) may further include functionality to, e.g.: (i) reliably discard (or delete) one or more child segments (stored as "values" or "child entries") referenced/pointed by a related parent segment (stored as a "key" or a "parent entry"); (ii) store one or more metadata segments of a segment tree (see FIG. 2); (iii) perform data protection related (or key related) operations (e.g., key management operations, key policy operations, key introduction operations, re-keying operations, managing existing keys, deleting older keys, etc.), in which (a) the key related operations may be used to manage how data is encrypted or decrypted, (b) the associated policies may determine when keys are introduced, how many keys are allowed, when data is rekeyed, and the like, and (c) the aforementioned operations may be independent of each other and may be performed asynchronously or synchronously; and/or (iv) include a module that perform the aforementioned operations using resources that are available (e.g., not being used by another workload) in the KVS (135), in which by using the available resources (or performing these operations in the background), the module may avoid having to specifically allocate resources to the operations that could impact the performance of other workloads. One of ordinary skill will appreciate that the KVS (135) may perform other functionalities without departing from the scope of the embodiments disclosed herein.

In one or more embodiments, the KVS (135) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the KVS described throughout the application.

Alternatively, in one or more embodiments, similar to a client (e.g., 110A, 110N, etc.), the KVS (135) may also be implemented as a logical device.

In one or more embodiments, the distributed dedupe storage platform (120) may be a scale-out storage platform (e.g., a storage cluster) that includes/hosts, at least, the manager (127) and any number of storage nodes (e.g., Storage Node A (125A), Storage Node N (125N), etc.).

In one or more embodiments, a storage node (e.g., 125A, 125N, etc.) may provide less, the same, or more functionalities and/or services (described above) compared to the IN (140). A software service/application may be installed/deployed (by a related user) to a node/server so that the node can be turned into a storage node (e.g., 125A, 125N, etc.) that contributes disks to the distributed dedupe storage platform (120). Working together, several storage nodes (e.g., 125A, 125N, etc.) may abstract local storage (e.g., object storage, block storage, etc.) and present volumes to the clients (e.g., 110A, 110N, etc.). Further, each software service may leverage storage resources (e.g., SSDs, storage class memory, spinning disk media, available RAM, etc.) of a corresponding "storage" node, and each storage node (e.g., 125A, 125N, etc.) may be a fault unit.

Referring to FIG. 1, (i) Storage Node A (125A) may be part of a first business operation region (BOR) and may execute on a first geographic location in the world and (ii) Storage Node N (125N) may be part of a second BOR and may execute on a second geographic location in the world, in which the first geographic location and the second geographic location may be distinct locations.

In one or more embodiments, as being a log-structured storage platform that processes incoming data from, for example, the clients (e.g., 110A, 110N, etc.) and/or from the IN (140) (via the manager (127)), the distributed dedupe storage platform (120) may be configured to, e.g.: (i) store encrypted and/or unencrypted data (e.g., store any information utilized by the clients and/or by the IN such as full and incremental backups) across multiple physical storage nodes/units (e.g., 125A, 125N, etc.), (ii) perform data encryption and decryption operations (using cryptographic keys as well as generating or otherwise obtaining and updating such keys), (iii) perform data compression and decompression operations across one or more storage nodes, (iv) perform, via a dedupe engine (129), automatic data deduplication operations on unencrypted data ((a) to identify and eliminate redundant data during, for example, a data backup process (only unique data segments may be stored and duplicates may be replaced with references to optimize storage space) and (b) with the remaining data/content packed into one or more compression regions (not shown)) across one or more storage nodes, (v) service requests received from the clients (e.g., 110A, 110N, etc.) and/or the IN (140) to access data on the storage nodes (e.g., 125A, 125N, etc.); (vi) partition, via the dedupe engine (129), ingested data into discrete data chunks (e.g., segments, see FIG. 2) that are to be, for example, compared, identified as duplicate, and eventually removed (in which the partitioning may be performed with different granularity, using various criteria for data chunk boundaries as well as for their sizes); (vii) perform data synchronization and/or coordination among different storage nodes (e.g., 125A, 125N, etc.); (viii) store different types of data (e.g., files, data blocks, objects (where data may be wrapped into objects and identified by a unique identifier or a hash value)) that may be distributed across several computing devices (e.g., 125A, 125N, etc.); and/or (ix) provide high-performance and low-latency network access to one or more storage nodes (e.g., 125A, 125N, etc.) for users of a client (e.g., 110A, 110N, etc.) and/or the IN (140).

In one or more embodiments, a client (e.g., 110A, 110N, etc.) and/or the IN (140) may read and/or write data from/to memory and/or persistent storage device(s) (not shown) of one or more storage nodes (e.g., 125A, 125N, etc.) via an NVMe over fabric (NVMe-of) protocol, a remote direct memory access (RDMA) protocol, and/or a network file system (NFS) protocol. As a non-limiting example, a client (e.g., 110A, 110N, etc.) may execute connection software (not shown) that facilities a connection between the client and one or more storage endpoint(s) (e.g., a storage target, a storage node (e.g., 125A)) over the network (130). The storage node may persist data on NVMe storage devices (not shown) in which the client may execute connection software that is configured to connect to and access the NVMe storage devices of the storage node.

In one or more embodiments, a storage node (e.g., 125A, 125N, etc.) may be a computing device that, at least, executes software configured to handle (read and/or write) data in memory and/or physical storage device(s) of the storage node. Data stored to one or more storage device(s) across one or more storage node(s) (e.g., 125A, 125N, etc.) may be logically grouped into one or more storage volume (s) (not shown).

In one or more embodiments, a storage volume may be a logical storage structure that stores data for use by one or more clients (e.g., 110A, 110N, etc.) and/or the IN (140). A storage volume may be allocated (i) across one entire physical storage device, (ii) on a portion of one physical storage device, (iii) across two or more physical storage devices, (iv) across two or more portions of two or more physical storage devices, and/or (v) any combination thereof.

Further, in one or more embodiments, when a storage volume persists across two or more physical storage devices, those storage devices may be located in two or more storage nodes (e.g., 125A, 125N, etc.). Accordingly, a storage volume may provide a logical namespace that acts as a layer of indirection between software utilizing data and the data itself (e.g., software executing on a client (e.g., 110A) and the underlying physical storage devices located across one or more storage nodes (e.g., 125A, 125N, etc.)). Non-limiting examples of a storage volume may include an NVMe namespace, an NFS share, a redundant array of independent disks (RAID) array, etc.

In one or more embodiments, a storage node (e.g., 125A, 125N, etc.) may provide long-term, durable, high read/write throughput data storage/protection with near-infinite scale and low-cost. The storage node may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. In one or more embodiments, the storage node may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the storage node (e.g., 125A, 125N, etc.) may include a memory device (e.g., a dual in-line memory device, dual in-line memory, etc.), in which data is stored and from which copies of previously stored data are provided. As yet another example, the storage node may include a persistent storage device (e.g., an SSD), in which data is stored and from which copies of previously stored data is provided. As yet another example, the storage node may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

In one or more embodiments, unstructured and/or structured data (stored by a storage node (e.g., 125A)) may be updated (automatically) by the manager (127) (including the manager's components) when, for example, (but not limited to): newer system logs are received, a health state of a client (e.g., 110A) is changed, etc.

In one or more embodiments, through different types of virtualization, the distributed dedupe storage platform (120) (via the manager (127)) may present one or more storage nodes (e.g., 125A, 125N, etc.), for example, to a client (e.g., 110A, 110N, etc.) such that the storage nodes appear to be locally attached, ensuring the highest simultaneous access speed available for media and mission critical stored data.

Further, the distributed dedupe storage platform (120) may be used to, for example (but not limited to): improve application (and/or data) availability (e.g., via multiple data paths, internal fallback (e.g., hardware redundancy) mechanisms, etc.), enhance application performance of the clients (e.g., 110A, 110N, etc.) and/or the IN (140) (e.g., via off-load storage functions, segregate networks, etc.), increase storage utilization and effectiveness (e.g., by consolidating storage resources, providing tiered storage, etc.), etc.

As discussed above, the distributed dedupe storage platform (120) may provide data protection (e.g., data backup, data replication, data management, data restore, etc.) services to the clients (e.g., 110A, 110N, etc.) (or any other component of the system (100)) via the manager (127) (including the manager's components). The data protection services may initiate generation and storage of backups (e.g., block-based backups, file-based backups, etc.) in one or more storage nodes (e.g., 125A, 125N, etc.). The data protection services may also include restoration of, for example, the clients (e.g., 110A, 110N, etc.) (or any other component of the system (100)) to a restoration node (not shown) using the backups stored (temporarily or permanently) in the storage nodes.

Further, the distributed dedupe storage platform (120) may provide data protection services to the clients (e.g., 110A, 110N, etc.) (or any other component of the system (100)) by orchestrating (or scheduling): (i) generation of backups of the clients, (ii) storage of the generated backups of the clients, (iii) consolidation of one or more backup requests to reduce (or to prevent) generation of backups that are not useful for restoration purposes, and (iv) restoration of the clients to previous states using backups stored in one or more storage nodes (e.g., 125A, 125N, etc.).

Referring to FIG. 1, each storage node (e.g., 125A) may include a log-structured merge (LSM) (e.g., LSM Tree A). As used herein, an LSM tree is a data structure used for efficient data storage and retrieval in scenarios involving large volumes of data and frequent updates while being disk input/output (I/O) friendly. Incoming data writes may be written into a fast in-memory data structure known as memtables, in which memtables may be sorted and written to a disk (of a related storage node) using a sorted string tables (SSTs) format (e.g., a format for storing key-value pairs in which keys are listed in a sorted order). As the number of SSTs grows, multiple SSTs may be merged to generate larger SSTs (e.g., reference tables), allowing for efficient data search across the related storage nodes (e.g., 125A, 125N, etc.).

Turning now to the manager (127), the manager (127) (e.g., a storage platform manager) may be a computing device that manages (e.g., creates, monitors, facilitates, modifies, removes, etc.), at least, one or more storage nodes (e.g., 125A, 125N, etc.), one or more storage volumes, and/or the connections among the storage nodes and the clients (e.g., 110A, 110N, etc.). In one or more embodiments, the manager (127) may include/host, at least, the dedupe engine (129) and a garbage collector (128) (that performs at least one or more garbage collection operations across the distributed dedupe storage platform (120)).

One of ordinary skill will appreciate that the manager (127) (and each component of the manager, including the garbage collector (128) and the dedupe engine (129)) may perform other functionalities without departing from the scope of the embodiments disclosed herein. In one or more embodiments, the manager (127) may be configured to perform all, or a portion, of the functionalities described in FIGS. 5.1-5.2. The manager (127) (and each component of the manager) may be implemented as a computing device using hardware (e.g., any number of integrated circuits for processing computer readable instructions), software (e.g., a computer program), or any combination thereof.

In one or more embodiments, all, or a portion, of the components of the system (100) may be operably connected to each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN, the storage nodes, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the IN through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VOIP), etc.

While FIG. 1 shows a configuration of components, other system configurations may be used without departing from the scope of the embodiments disclosed herein.

Figure 2:
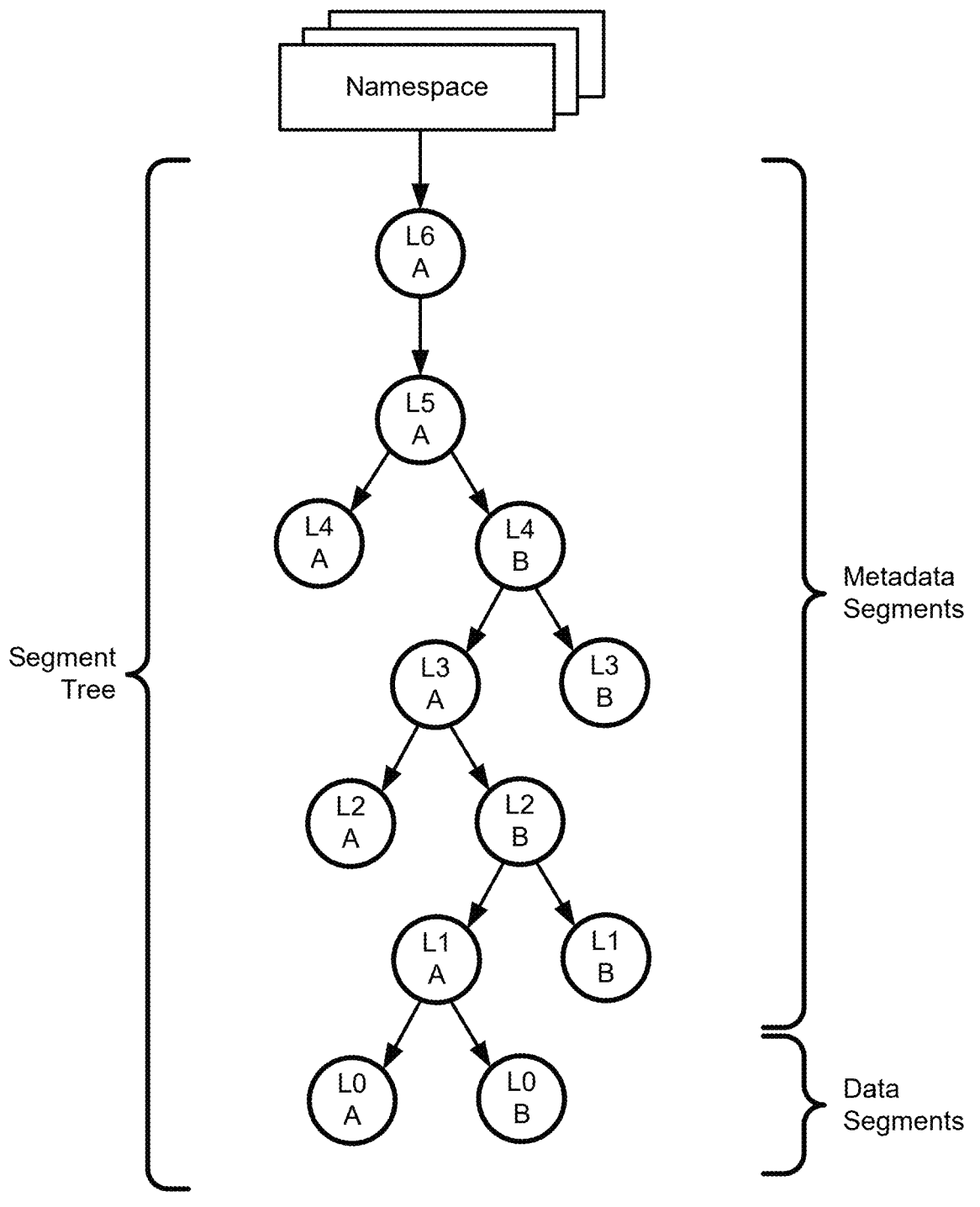
FIG. 2 shows an example segment tree in accordance with one or more embodiments disclosed herein.

Turning now to FIG. 2, FIG. 2 shows an example segment tree in accordance with one or more embodiments disclosed herein. The example, illustrated in FIG. 2 and described below, is for explanatory purposes only and not intended to limit the scope disclosed herein.

In one or more embodiments, the example segment tree may include, for example (but not limited to): one or more data segments (e.g., each data segment may be around 8 kilobytes (KB) in size), one or more metadata segments (e.g., each metadata segment may be around 4 KB in size), a namespace (e.g., a file handle, a content handle, etc.) of a file, etc.

In one or more embodiments, incoming user data (to the distributed dedupe storage platform (e.g., 120, FIG. 1)) may be segmented/chunked into variable size segments (by the manager (e.g., 127, FIG. 1)) on an average between 4 KB to 12 KB, with 8 KB segments being a useful average. More specifically, the manager (via the dedupe engine (e.g., 129, FIG. 1)) may divide (or break) incoming storage objects (e.g., assets/data that are often compound storage objects including many individual storage objects) into one or more data chunks (e.g., segments, storage objects, etc.). Further, the manager (e.g., 127, FIG. 1, via its dedupe engine) may generate a cryptographic hash value (e.g., a cryptographic fingerprint, a hash, etc.) for each segment using its hash calculation mechanism, for example, by employing a secure hash algorithm/model (e.g., SHA-1, SHA-256, etc.), in which, in the distributed dedupe storage platform (e.g., 120, FIG. 1), a fingerprint (of a segment) may be a 24-byte entity (e.g., a 24-byte message digest, a 24-byte reference, etc.) of an (average) 8 KB segment. To this end, files (and data segments of those files) in the distributed dedupe storage platform (e.g., 120, FIG. 1) may be represented with a tree of fingerprints.

In one or more embodiments, the manager (e.g., 127, FIG. 1) may maintain a "hash value lookup table" (e.g., a key-value table in the KVS (e.g., 135, FIG. 1)) as storage object information (e.g., data chunk to hash value metadata). The hash value lookup table may represent (or specify) an index (e.g., a deduplication index, a deduplication directory, etc., which is utilized in detecting duplicate data chunks) where the hash values for stored data chunks may be maintained in that index. For example, a hash value of a data chunk (as being a digital signature that uniquely identifies an associated data chunk) being considered may be looked-up in the hash value lookup table. If an entry is found for that hash value, then a redundant data chunk is identified, and that data chunk may be replaced with a pointer to the matching data chunk (e.g., a pointer to a single copy of the matching data chunk) maintained in a storage node (e.g., in a corresponding drive of the storage node). In this manner, the manager may only store non-redundant data chunks in the corresponding drive.

As indicated above, the hash value lookup table may be maintained by the manager (e.g., 127, FIG. 1). The manager may add, remove, and/or modify information included in the hash value lookup table. The manager may do so based on information or a request/call obtained from administrators, other data structures, and/or from other sources (e.g., the IN (e.g., 140, FIG. 1)). The data structures of the hash value lookup table may be implemented using, for example, lists, tables, unstructured data, databases, etc. While described as being stored locally, the hash value lookup table (or various portions thereof) may be stored remotely and may be distributed across any number of devices (e.g., may be stored at alternative locations within the system (e.g., 100, FIG. 1)) without departing from the embodiments disclosed herein.

Referring to FIG. 2, with the help of the manager (e.g., 127, FIG. 1), a file system in the distributed dedupe storage platform (e.g., 120, FIG. 1) may use/implement a segregated architecture to store metadata and data (e.g., associated with files). For example, a file system of the distributed dedupe storage system (e.g., 120, FIG. 1) may use a segregated architecture to store metadata of files to the KVS (e.g., 135, FIG. 1) and to store the data of the files to one or more storage nodes of the distributed dedupe storage system.

In one or more embodiments, metadata may be a set of name-value pairs (and kept in corresponding metadata segments) that provides information about an object/file (e.g., time/date information when the file is last modified). In this "segment tree based file system", files may be stored as the example segment tree (where the files may be associated with data and metadata such that the files may be associated with metadata segments and L0 segments (data segments)), in which (i) the lowest level of the tree (e.g., Level 0 (L0) A segment, L0 B segment, etc.) may be a hash of user data (e.g., data chunks directly written by a user may be called as "L0 data segments") and (ii) the intermediate levels of the example segment tree (e.g., Level 1 (L1) segments (e.g., L1 A segment, L1 B segment, etc.), Level 2 (L2) segments (e.g., L2 A segment, L2 B segment, etc.), etc.) may be hashes of corresponding child nodes/segments (e.g., L1 A segment and L1 B segment may be referenced by a Level 2 (L2) segment).

More specifically, segments of user data (e.g., data segments, the data portion of the segment tree) may be called/assigned as L0 segments in the segment tree (and stored to a related storage node(s) (e.g., 125A, 125N, etc.)) and metadata segments (e.g., remaining segments of the segment tree) may be called as "Lp" segments (and stored to the KVS (e.g., 135, FIG. 1) as an index, where a "key" is a parent segment and a "value" is a child segment(s) hosted by the parent segment), in which "p" is a parameter that ranges from one to six (e.g., L1 through Level 6 (L6)) and indicates metadata representing (or related to) a corresponding file. Said another way, (a) metadata segments of the segment tree may include segments from L6 of the segment tree to L1 of the segment tree, (b) the metadata segments of the segment tree may be stored to the KVS, and (c) a key in the KVS may represent a parent segment and a value associated with the key may represent a set of child segments hosted by the parent segment.

Referring to the distributed dedupe storage platform/system (e.g., 120, FIG. 1), levels may be from L1 through L6 (where the storage system may support generation of the metadata segments up to L6), in which L6 is the highest level of the segment tree (e.g., the root of the segment tree). When two or more L0 segments are accumulated, an L1 "parent" segment may be formed (e.g., L1 A segment may be a parent of L0 A and L0 B "child" segments, in which L1 A segment may comprise cryptographic hash values of L0 A and L0 B segments). When the number of L0 segments exceeds the span of a L1 parent segment (e.g., L1 A segment), a second L1 parent segment (e.g., L1 B segment) may be formed, at which point an L2 segment (e.g., L2 B segment) may be formed (as a parent to L1 A and L1 B "child" segments (where the parent includes (e.g., points to, references, etc.) a collection of child segments (or child message digests/fingerprints)), from the perspective of L2 B segment). This may keep occurring until the file is completely created (in the file system).

As indicated, all files (in the file system) may have an L6 segment (e.g., L6 A segment) as the top segment, which, in turn, can point/reference to any of the lower-level segments between L5 segments through L0 segments (depending on the size of a related file). Said another way, each file of the data may be represented with an L6 segment and corresponding lower level segments in the segment tree depending on a size of each file. However, (a) L5 segments (e.g., L5 A segment) may only point to Level 4 (LA) segments (e.g., L4 A segment, L4 B segment, etc.), (b) LA segments (e.g., LA A segment, L4 B segment, etc.) may only point to Level 3 (L3) segments (e.g., L3 A segment, L3 B segment, etc.), (c) L3 segments (e.g., L3 A segment, L3 B segment, etc.) may only point to L2 segments (e.g., L2 A segment, L2 B segment, etc.), (d) L2 segments (e.g., L2 A segment, L2 B segment, etc.) may only point to L1 segments (e.g., L1 A segment, L1 B segment, etc.), and (e) L1 segments (e.g., L1 A segment, L1 B segment, etc.) may only point to L0 segments (e.g., L0 A segment, L0 B segment, etc.).

Figure 3:
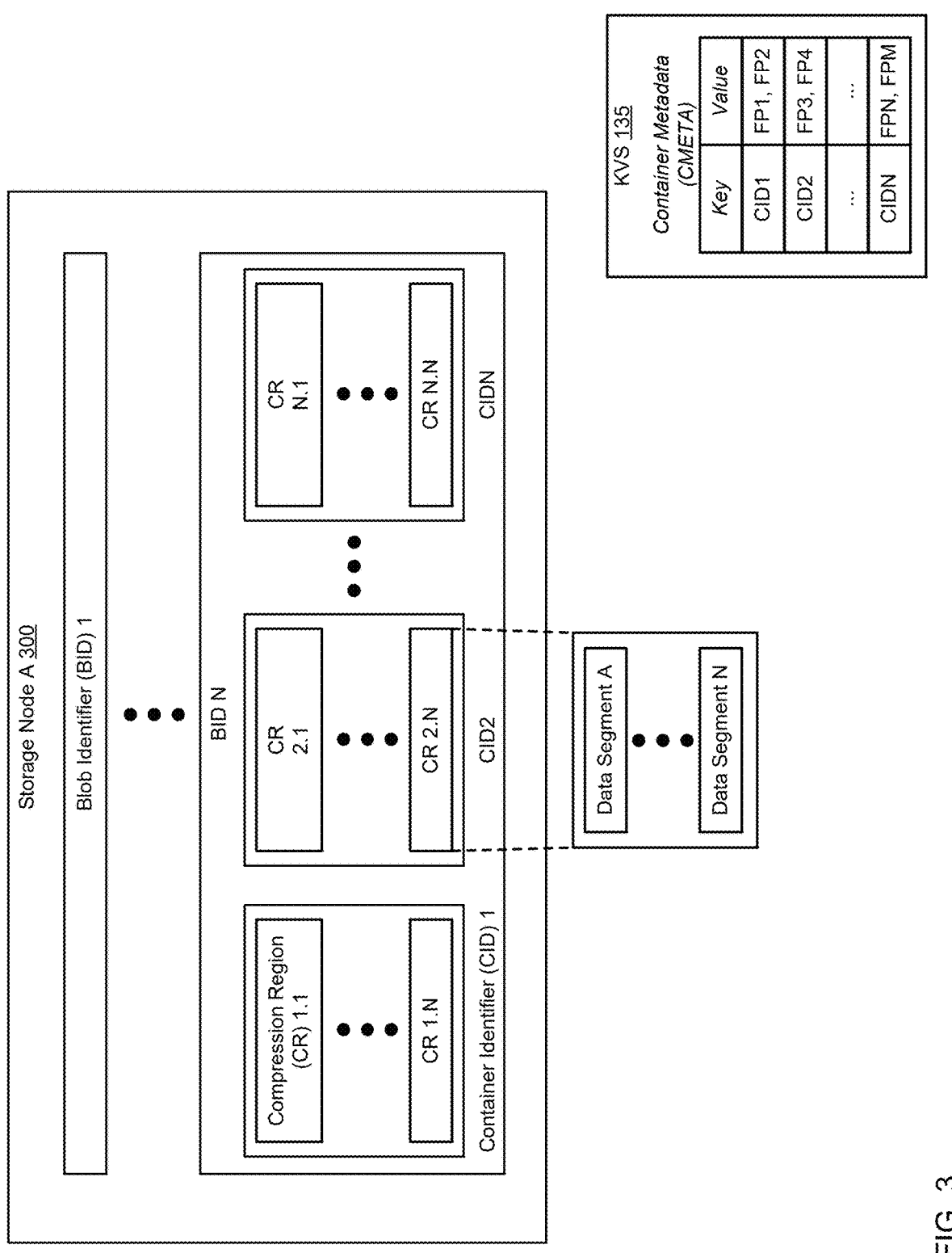
FIG. 3 shows a diagram of a storage node and a diagram of a key-value store (KVS) in accordance with one or more embodiments disclosed herein.

Turning now to FIG. 3, FIG. 3 shows a diagram of Storage Node A (300) and a diagram of the KVS (e.g., 135, FIG. 1) in accordance with one or more embodiments disclosed herein. Storage Node A (300) may be an example of a storage node discussed above in reference to FIG. 1. Storage Node A (300) includes any number of blobs (indicated by blob identifiers (BIDs)). Storage Node A (300) may include additional, fewer, and/or different components without departing from the scope of the embodiments disclosed herein. As used herein, an "identifier" may include, for example (but not limited to): a unique tag, an alphanumeric entry, etc.

Referring to FIG. 3, a blob is a collection of one or more "metaless (not including metadata)" containers (e.g., Container 1 (indicated by its CID "CID 1")), in which metadata of each container (in a given blob) is stored separately (e.g., in container metadata (CMETA) of the KVS) and user data (e.g., data segments) are stored in units of blobs (e.g., in containers (more specifically, in compression regions (CRs))). Further, a container may be identified via its CID (e.g., CID 1, CID, 2, etc.) and may host one or more CRs (e.g., CR 1.1, CR 2.1, etc.).

In one or more embodiments, container metadata may include information (as "key-value" items) that helps, for example, the manager (e.g., 127, FIG. 1) (via its dedupe engine) to look up a segment (e.g., Data Segment A, Data Segment N, etc.) within a specific container (e.g., a container with identifier "CID 2"). Said another way, container metadata may indicate/specify in which CR (in a given container) and at what offset (in the CR) a target segment (and/or a fingerprint of a target segment) resides (e.g., CR 1.1-Offset A, CR N.1-Offset C, etc.). Further, container metadata may also specify an index (e.g., a look up dictionary, an index table, etc.) that maps a segment(s) to a corresponding container (via its CID) (using fingerprints "FP5", discussed below) (e.g., "CID1 (key)-FP1, FP2 (value, as the metadata portion of the container)", "CID2 (key)-FP3, FP4", etc.). Said another way, for a given segment, the index may specify which container(s) host the segment.

Referring to FIG. 3, one or more segments are put into a related CR (e.g., Data Segment A and Data Segment N are put into CR 2.N). As used herein, a "CR" is a virtual entity that is compressed and encrypted (by the dedupe engine (e.g., 129, FIG. 1) using a set of linear, non-linear, and/or ML models/algorithms) as an atomic unit, in which multiple such CRs may be packed in a metaless container.

In one or more embodiments, using the dedupe engine (e.g., 129, FIG. 1), ingested (or user-requested) data may be chunked into one or more data chunks/segments (where two or more segments may be packed into a CR) and then fingerprinted using a hash model. For example, (i) contents of a segment may be represented by a 24-byte fingerprint, which constitutes a 20-byte fingerprint (e.g., a 20-byte SHA1 fingerprint) and 4-byte checksum, and (ii) contents of a data segment (e.g., L0 A segment) may be user data and contents of a metadata segment (e.g., L3 A segment) may be metadata (e.g., a hash value of hash values associated with L2 A segment and L2 B segment).

A related fingerprint (which may help the dedupe engine to find which CR (in a related container) and at what offset (in the container) a corresponding segment resides) may then be looked up (by the dedupe engine) against the index included in the container metadata. If the ingested data is a dedupe sequence, then the existence of the fingerprint (in the index) may indicate that data already exists, and the "ingested" data should not be written but simply deduped (in accordance with the existing data).

Separately, if the ingested data is a read sequence, the container metadata may indicate a related CID (through the "CR-segment" and "CID-FP" mappings). First, the dedupe engine (e.g., 129, FIG. 1) may read the container metadata to identify (i) a CR that is related to the CID (or a CR related to the container), (ii) the position of the CR in the container, and (iii) the position of a related segment in the CR. Thereafter, the segment may be identified using one or more offsets (associated with the segment) available in the container metadata.

Figure 4:
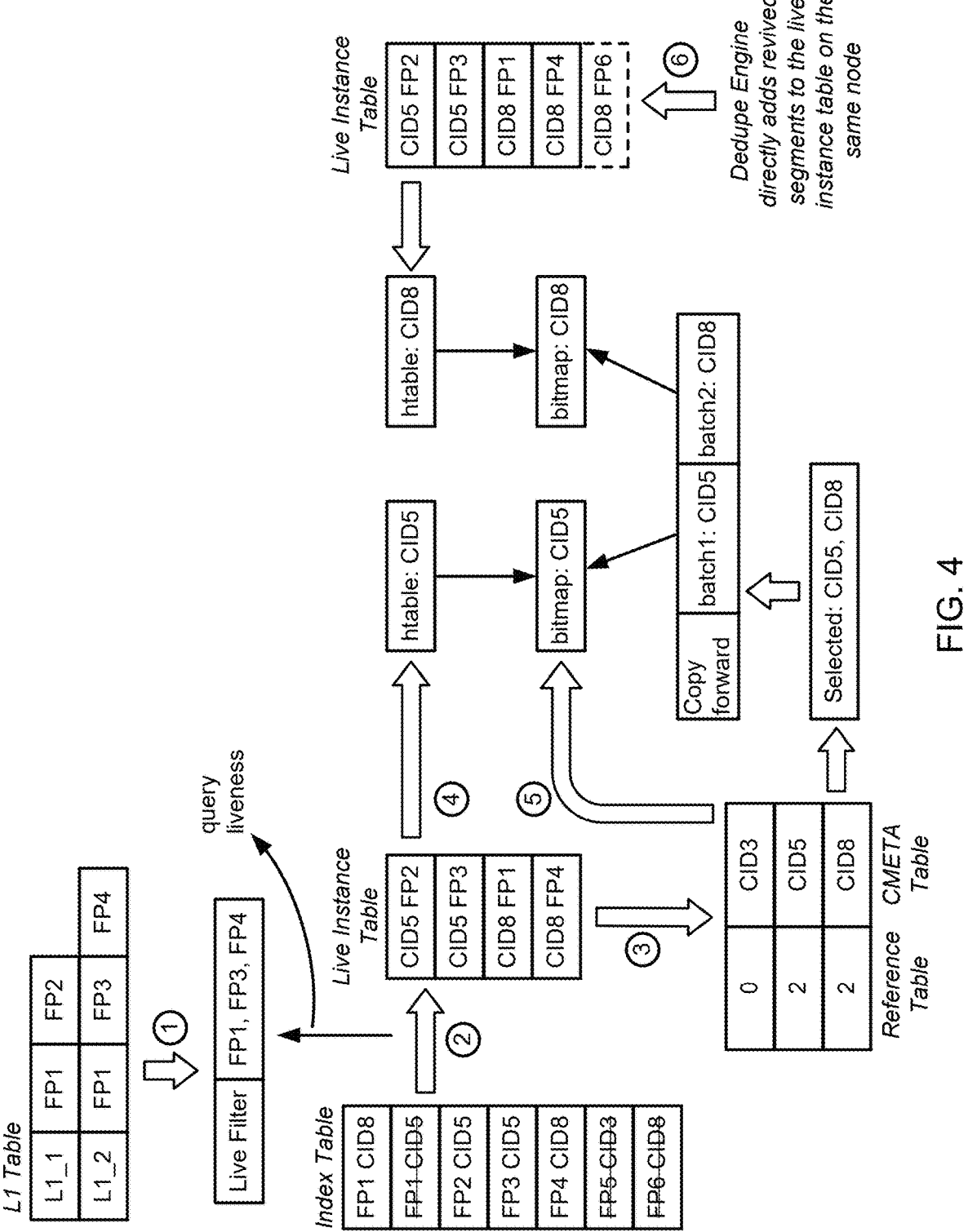
FIG. 4 shows an example garbage collection operation (performed using a live instance table) in accordance with one or more embodiments disclosed herein.

Turning now to FIG. 4, FIG. 4 shows an example garbage collection operation (performed using a live instance table (hosted by the KVS (e.g., 135, FIG. 1))) in accordance with one or more embodiments disclosed herein. The example, illustrated in FIG. 4 and described below, is for explanatory purposes only and not intended to limit the scope disclosed herein.

Referring to FIG. 4, at first (illustrated with "1"), the garbage collector (e.g., 128, FIG. 1) may generate/build a live filter (or a liveness filter) from an L1 table for all the L0 data segments that are being referenced (e.g., by iterating a corresponding namespace so that all the segments referred by a related fingerprint(s) can be identified (or kept track)). Thereafter (illustrated with "2"), the garbage collector (e.g., 128, FIG. 1) may iterate an index table (e.g., a search table) for all the fingerprints (FPs) to return/obtain data items in a "FP+CID" format, in which, referring to FIG. 3, contents of a segment may be represented by a 24-byte fingerprint and fingerprints that are not in the live filter (e.g., FP5 and FP6) are assumed dead (e.g., not currently being used, inactive, etc.). Further, the garbage collector may identify duplicated fingerprints (e.g., FP1) sequentially during the iteration and may consider a fingerprint (of the duplicated fingerprints) with the highest CID as alive (e.g., being used, live, active, etc.). With dead and duplicated fingerprints removed from the index table (e.g., "FP1 CID5", "FP5 CID3", and "FP6 CID8" are removed, which are illustrated as " ", " ", and " "), the garbage collector may generate a live instance table (in the KVS) by inserting live fingerprints (along with their corresponding CIDs) following a "CID+FP" format. In one or more embodiments, in the "CID+FP" format, a short fingerprint (e.g., 4 bytes instead of 24 bytes) may be used to save storage space in the KVS and there's no big impact on efficiency of garbage collection because false positive rate is low (e.g., within one container, a false positive rate of a 4 bytes fingerprint is close to zero).

For example, for two 24-byte fingerprints, there is a possibility that these fingerprints may have the same 4 bytes prefix. For this reason, while the garbage collector (e.g., 128, FIG. 1) is performing a copy forward operation, a dead/inactive fingerprint may collide with a 4 bytes live/active "short" fingerprint (in the live instance table), which may cause an inactive fingerprint being copied forward instead of being left for deletion (or garbage collection). Such inactive fingerprints (which are in fact considered as active fingerprints) may be calculated as the false positive rate. Since there are limited number of fingerprints in a given container (e.g., a few thousands), such possibility of collision is very low (so, the false positive rate is close to zero).

In one or more embodiments, the live filter may only be needed until the live instance table is generated (e.g., until "3") and can be freed up once the live instance table is generated (so that memory that is being used by the live filter can be reclaimed).

Further, illustrated with "3", the garbage collector (e.g., 128, FIG. 1) may iterate the live instance table (which is sorted in a lexicographical order) to count the number of live fingerprints for each CID (e.g., CID3→0 ("0" indicates a container with "CID3" has no live/alive segment, which makes this container a candidate for deletion), CID5→2 ("2" indicates a container with "CID5" has two live segments, which makes these live segments candidates to be copied forward to a newer container(s)), and CID8→2, see "Reference Table") and to keep a related counter in memory (e.g., in a memory device) or in KVS table if there's a large number of CIDs (the KVS table may only be referenced with sequential iteration, therefore no big impact on performance). Said another way, the garbage collector may use the counter (e.g., a live segment counter or a live fingerprint counter) to employ a liveness threshold while identifying one or more live segments (in a related container) just before performing a copy forward operation.

As used herein, a lexicographical order may refer to an arrangement of characters, words, and/or numbers (e.g., in a dataset) in an alphabetical order (e.g., sorting the letters from A to Z).

Thereafter, illustrated with "4", the garbage collector (e.g., 128, FIG. 1) may initiate performing a copy forward operation. As part of the copy forward operation, the garbage collector may process selected CIDs (e.g., CID 5, CID8, etc.) in batches (e.g., for not consuming all the available memory in a corresponding storage node(s)). For each CID in a given batch (e.g., batch1: CID5, batch2:CID8, etc.), the garbage collector may iterate corresponding fingerprints (e.g., FP2 and FP3 for a container with "CID5", FP1 and FP4 for a container with "CID8", etc.) and load the fingerprints into memory to perform a liveness check of related segments (e.g., whether or not a segment is live/active (in use) or dead/inactive (not in use)) against container metadata (e.g., CMETA table).

In one or more embodiments, the garbage collector (e.g., 128, FIG. 1) may sort the fingerprints in the memory or simply insert the fingerprints into a hash map (e.g., a hash table (htable)), in which a separate htable may be generated for all the CIDs in the batch (e.g., for all the live segments (of each container) in the batch) to be copied forward and the hash key may be in a "CID+short FP" format. Referring to FIG. 4, separate htables may be generated for "batch1" and "batch2". Further, since the fingerprints for the same CIDs are saved/stored in the KVS (e.g., 135, FIG. 1) with the same CID as a prefix, the garbage collector (e.g., 128, FIG. 1) may perform a read operation (e.g., a container metadata read operation to load fingerprints associated with CID5 in memory) in the KVS in one sequential I/O.

Referring to FIG. 4, illustrated with "5", for each selected CID (e.g., for each selected container), the garbage collector (e.g., 128, FIG. 1) may obtain corresponding metadata/information from the CMETA table and, by using the information and related htables, generate a bitmap for all the segments (specified in the selected container). With the help of the generated bitmaps, the garbage collector may determine whether or not a CR (of a selected container or of a CID that represents the selected container) is (i) completely inactive (e.g., all the segments hosted/grouped in the CR are inactive) and (ii) completely live/active (e.g., all the segments hosted in the CR are active) or partially active (e.g., some of the segments hosted in the CR are active). For all those all live or all dead CRs, decompression is not needed, which can help to optimize the performance. Thereafter, as part of the copy forward operation, the garbage collector may copy forward live segments to a newer container(s).

Further, illustrated with "6", when data is ingested during an ongoing garbage collection operation (e.g., across the distributed dedupe storage platform (e.g., 120, FIG. 1)), the dedupe engine (e.g., 129, FIG. 1) may directly write/add revived segments (e.g., segments that were not referenced by any files (e.g., at time 0) but now (e.g., at a later time after time 0) being referenced by a related file) to the live instance table (e.g., as including a revived segment(s), CID8 may be added to the live instance table along with a fingerprint(s) "FP6" of the revived segments).

In one or more embodiments, since the cost of writing a revived segment is similar to that of writing a short fingerprint, writing the revived segment should have little impact on the data ingest performance (of a related storage node (e.g., 125A, FIG. 1)). In the meantime, the revived segments listed in the live instance table may be directly picked up (by the garbage collector (e.g., 128, FIG. 1)) in the next batches (where no temporary memory is needed to revive a segment).

In one or more embodiments, in order to perform an optimized, live instance table-based garbage collection operation, the garbage collector (e.g., 128, FIG. 1) may (i) preload the live instance table in parallel to reduce latency while a copy forward operation is being performed (to this end, extra time needed to load the live instance table can be got rid of) and (ii) only use/keep the "in-memory" live filter until the live instance table is generated (and then the live filter may be released to minimize excessive memory utilization of the live filter). To perform (ii) in the distributed dedupe storage platform (e.g., 120, FIG. 1), the garbage collector (e.g., 128, FIG. 1) may dedicate one or more storage nodes (e.g., 125A, 125N, FIG. 1) (more specifically, the garbage collector may manage the live filter's large memory requirement by using memory resources of the dedicated storage nodes). Once the live instance table is generated, other storage nodes (in the storage platform) may support the garbage collector to perform a corresponding copy forward operation (with the help of the live instance table). To this end, in a given distributed dedupe storage platform, the total memory needed to perform a garbage collection operation can be significantly reduced.

As discussed above, in one or more embodiments, (i) a memory efficient method/framework to perform a "data" garbage collection operation (in a distributed dedupe storage platform) is provided/enabled (where (a) a live instance table is generated on a KVS and (b) the live instance table is preloaded efficiently (due to the fact that live segments for the same container may adjacent to each other) into memory before performing a copy forward operation for related live segments), (ii) in-memory search data structures (e.g., sorted strings, htables, hash maps, etc.) are generated from the live instance table for one or more CIDs (of a current copy forward batch) with limited amount of memory (where these data structures may be used to generate one or more "liveness" bitmaps based on container metadata of related containers for a quick in-memory data look up), (iii) short fingerprints are utilized for the live instance table (to save storage space), (iv) the dedupe engine (e.g., 129, FIG. 1) can directly write one or more revived segments into the live instance table, which can be picked up by the garbage collector (e.g., 128, FIG. 1) in the next batch of a related copy forward operation (to avoid the need of extra memory and/or storage space for segment revival), (v) (within the distributed dedupe storage platform) because of its large memory utilization, the live filter is allocated to multiple storage nodes (where the live filter is used to generate the instance table for the whole storage platform/cluster) and the garbage collector (in conjunction with the remaining storage nodes in the storage platform) uses the live instance table to perform a related copy forward operation (in which this unbalanced memory allocation across the storage platform may significantly reduce the total memory consumption required to perform a garbage collection operation across the storage platform), (vi) in order to perform a garbage collection operation, the garbage collector may perform a combination of mark-and-sweep and reference-based garbage collection approaches (where (a) for regular file system I/Os, no reference count needs to be maintained, (b) during an ongoing garbage collection operation, the mark-and-sweep approach may be used to identify live segments and/or inactive segments, meanwhile a "temporary" reference table (see FIG. 4, which indicates the number of live segments in a related container) for the live segments is generated (and used for identifying which "identified/selected" live segments should be copied forward)), and/or (vii) one or more live fingerprint counters (from the live instance table) are utilized to compute a liveness threshold to help the garbage collector in selecting containers with a low-liveness state (e.g., containers that includes a smaller number of live segments) just before performing a related copy forward operation (this reduces the chance of copying forward a segment whose liveness is changed from inactive to live/ active during the course of a garbage collection operation (as a result of reviving that segment) and improves the efficiency and accuracy of the copy forward operation).

In one or more embodiments, since a corresponding garbage collection operation can be retried, the live instance table can be rebuilt if anything goes wrong with respect to the operation. To this end, the KVS (e.g., 135, FIG. 1) may keep a single copy of the live instance table, which is accessible to the garbage collector (e.g., 138, FIG. 1) and to the dedupe engine (e.g., 139, FIG. 1) (so that the dedupe engine can directly update the live instance table to add one or more revived segments while the garbage collector is using the same live instance table to perform a related copy forward operation of live segments).

As described above, the distributed dedupe storage platform (e.g., 120, FIG. 1) is a log-structured file system, where data is stored in units of containers and deleting a file may not necessarily mean deleting the segments (associated with the file) from the storage platform as other files may be referring to these segments. For this reason, the garbage collector (e.g., 138, FIG. 1) may first identify whether or not a segment is being referred to by other files before that segment is live or inactive.

Further, while performing the mark-and-sweep garbage collection approach, the garbage collector (e.g., 138, FIG. 1) may use the live instance table to identify live segments and/or inactive segments and garbage collect the inactive segments.

Figure 5:
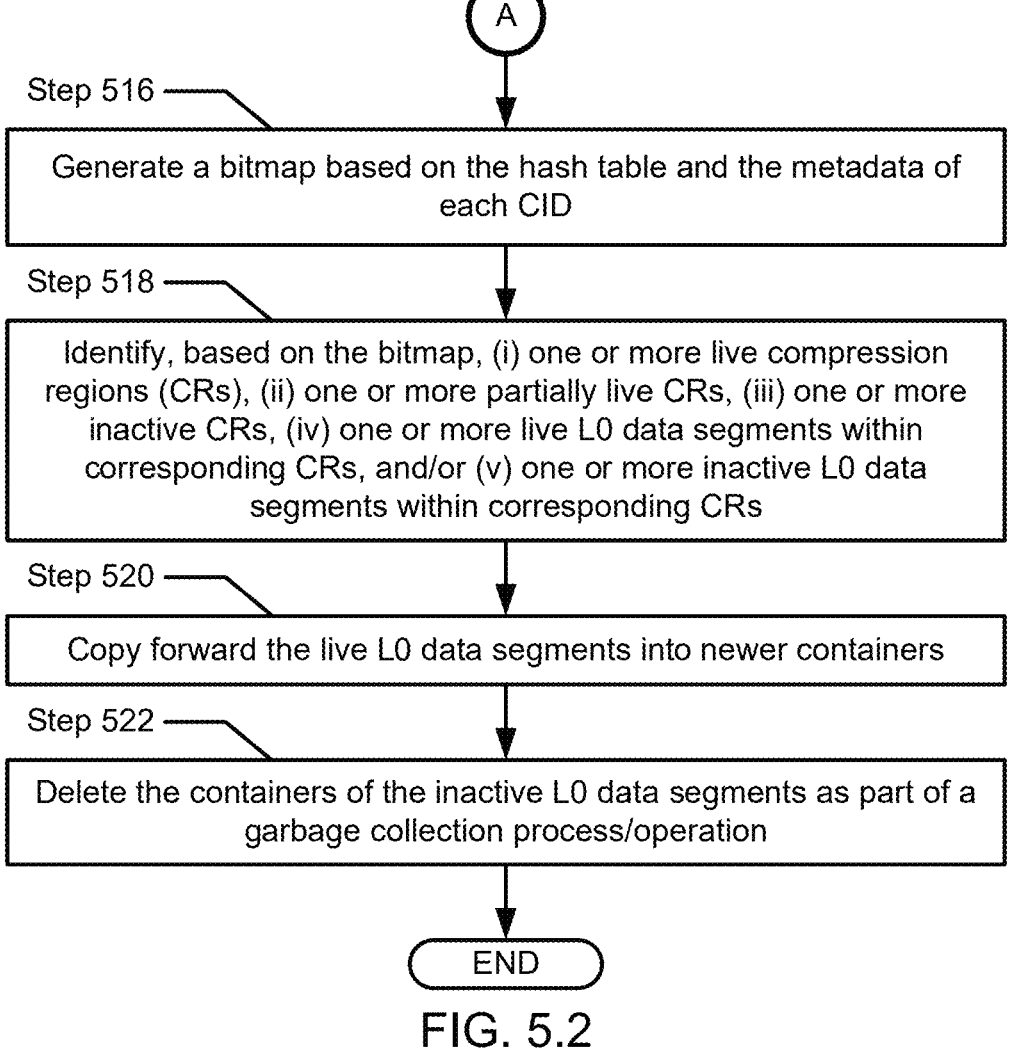
FIGS. 5.1-5.2 show a method for managing a garbage collection operation in a storage system in accordance with one or more embodiments disclosed herein.

FIGS. 5.1-5.2 show a method for managing a garbage collection operation in a storage system (e.g., the distributed dedupe storage platform (e.g., 120, FIG. 1)) in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 5.1, the method shown in FIG. 5.1 may be executed by, for example, the above-discussed manager (e.g., 127, FIG. 1) (in conjunction with processors of corresponding storage nodes (e.g., 125A, 125N, FIG. 1)). Other components of the system (100) illustrated in FIG. 1 may also execute all or part of the method shown in FIG. 5.1 without departing from the scope of the embodiments disclosed herein.

In Step 500, by employing linear, non-linear, and/or ML models, the manager (more specifically, the garbage collector (e.g., 129, FIG. 1)) generates a live filter using an L1 table, in which the L1 table includes information with respect to L0 data segments. In Step 502, the garbage collector iterates an index table (see FIG. 4) to obtain one or more fingerprints of data chunks (e.g., L0 data segments) and CIDs associated with the fingerprints.

In Step 504, by employing linear, non-linear, and/or ML models, the garbage collector generates a live instance table (see FIG. 4) (i) based on the index table and the live filter and (ii) by eliminating inactive or duplicated fingerprints (where (a) fingerprints that are not included in the live filter are assumed inactive and (b) fingerprints (with the highest CIDs) of the duplicated fingerprints are assumed active). Said another way, while the live instance table is being generated (in the KVS (e.g., 135, FIG. 1)), inactive fingerprints of the fingerprints or duplicated fingerprints of the fingerprints are eliminated, and active fingerprints of the fingerprints are considered.

In one or more embodiments, (i) inactive fingerprints may be a set of fingerprints that is not included in the live filter and (ii) an inactive fingerprint of the inactive fingerprints may indicate that a corresponding L0 segment of the L0 segments is not being used in a file system of the storage platform. Further, (i) the live instance table may include a portion (e.g., a first part) of the duplicated fingerprints that has the highest CIDs and (ii) a data segment (e.g., an L0 segment) pointed by the first part of the duplicated fingerprints may be assumed active, as the data segment pointed by the first part of the duplicated fingerprints is being used in a file system of the storage platform.

In one or more embodiments, to save storage space, the first part of the duplicated fingerprints and/or a first part of non-duplicated fingerprints may be used as short fingerprints. For example, the first part (e.g., the first four bytes or a portion) of the duplicated fingerprints can be used as short fingerprints. As used herein, duplicated fingerprints may refer to fingerprints that appeared in multiple containers. Separately, while duplicated fingerprints are included in the live instance table, fingerprints that appear in only one container may also be included in the live instance table.

In Step 506, the garbage collector iterates the live instance table to count live/active fingerprints for each CID (or for each container) and, in response to counting the active fingerprints, populates a reference table to indicate how many of the active fingerprints are related to each CID. In Step 508, based on the reference table and a liveness threshold, the garbage collector identifies (i) one or more containers that have a low-liveness state (e.g., containers that includes a smaller number of live segments) and (ii) one or more containers that have a high-liveness state (e.g., containers that includes a larger number of live segments).

In Step 510, based on Step 508, the garbage collector assigns each of the containers that has the low-liveness state to a batch (e.g., CID5 and CID8, see FIG. 4). In Step 512, for each CID in a given batch, the garbage collector identifies corresponding fingerprints and populates those fingerprints to a hash table (see FIG. 4). In Step 514, the garbage collector obtains metadata of each CID (e.g., of each container) from container metadata (or a container metadata table) that is being hosted by the KVS. In one or more embodiments, the container metadata table may specify, at least, one or more fingerprints that are associated with a set of live CRs, a CID that is associated with the set of live CRs, and a position of each of the set of live CRs in a container that is related to the CID. Following Step 514, the method proceeds to Step 516 of FIG. 5.2.

Turning now to FIG. 5.2, the method shown in FIG. 5.2 may be executed by, for example, the above-discussed manager (in conjunction with processors of corresponding storage nodes). Other components of the system (100) illustrated in FIG. 1 may also execute all or part of the method shown in FIG. 5.2 without departing from the scope of the embodiments disclosed herein.

In Step 516, by employing linear, non-linear, and/or ML models, the manager (more specifically, the garbage collector) generates a bitmap(s) based on the hash table and the metadata of each CID. In Step 518, based on the bitmap, the garbage collector identifies (i) one or more live CRs, (ii) one or more partially live CRs, (iii) one or more inactive CRs, (iv) one or more live L0 data segments within corresponding CRs, and/or (v) one or more inactive L0 data segments within corresponding CRs.

In one or more embodiments, referring to FIG. 2, (i) L0 data segments (or L0 segments) are data segments of a segment tree, (ii) the segment tree is stored to the distributed dedupe storage system (e.g., 120, FIG. 1), (iii) L0 segments are the lowest level segments in the segment tree, and (iv) remaining segments of the segment tree are assigned as metadata segments, in which (a) the metadata segments of the segment tree are stored to the KVS and (b) a key in the KVS represents a parent segment and a value associated with the key represents a set of child segments hosted by the parent segment.

In Step 520, the garbage collector copies forward the live L0 data segments to newer containers (and corresponding older containers may be deleted in Step 522, as part of a related garbage collection operation). In Step 522, the garbage collector deletes (or garbage collects) containers of the inactive L0 data segments (including those L0 data segments that have been copied forward) as part of the related garbage collection operation (so that most of the storage space used by the inactive L0 data segments can be reclaimed and consolidated). In one or more embodiments, the method may end following Step 522.

Turning now to FIG. 6, FIG. 6 shows a diagram of a computing device in accordance with one or more embodiments disclosed herein.

In one or more embodiments disclosed herein, the computing device (600) may include one or more computer processors (602), non-persistent storage (604) (e.g., volatile memory, such as RAM, cache memory), persistent storage (606) (e.g., a non-transitory computer readable medium, a hard disk, an optical drive such as a CD drive or a DVD drive, a Flash memory, etc.), a communication interface (612) (e.g., Bluetooth interface, infrared interface, network interface, optical interface, etc.), an input device(s) (610), an output device(s) (608), and numerous other elements (not shown) and functionalities. Each of these components is described below.

In one or more embodiments, the computer processor(s) (602) may be an integrated circuit for processing instructions. For example, the computer processor(s) (602) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (e.g., a LAN, a WAN, Internet, mobile network, etc.) and/or to another device, such as another computing device.

In one or more embodiments, the computing device (600) may include one or more output devices (608), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a garbage collection operation in a storage system, the method comprising:

generating a live filter using a Level 1 (L1) table,
  wherein the L1 table comprises information with respect to Level 0 (L0) segments;

iterating an index table to obtain fingerprints (FPs) of the L0 segments and container identifiers (CIDs) associated with the FPs;

generating a live instance table based on the index table and the live filter,
  wherein, while the live instance table is being generated, inactive FPs of the FPs or duplicated FPs of the FPs are eliminated and active FPs of the FPs are considered;

iterating the live instance table to count the active FPs for each CID,
  wherein, in response to counting the active FPs, a reference table is populated to indicate how many of the active FPs are related to each CID;

identifying, based on the reference table and a liveness threshold, a first container that has a low-liveness state and a second container that has a high-liveness state;

assigning the first container to a batch;

identifying FPs of the L0 segments associated with each CID in the batch,
  wherein the FPs are populated to a hash table;

obtaining metadata of each CID in the batch from a container metadata table;

generating a bitmap based on the hash table and the metadata;

identifying, based on the bitmap, a set of live compression regions (CRs), a set of inactive CRs, a set of live L0 segments within each of the set of live CRs, and a set of inactive L0 segments within each of the set of inactive CRs;

copying forward the set of live L0 segments to newer containers; and deleting containers of the set of inactive L0 segments as part of the garbage collection operation.

2. The method of claim 1, wherein the inactive FPs are a set of FPs that is not included in the live filter, and wherein an inactive FP of the inactive FPs indicates that a corresponding L0 segment of the L0 segments is not being used in a file system of the storage system.

3. The method of claim 1, wherein the live instance table comprises a first part of the duplicated FPs that has the highest CIDs, and wherein a data segment pointed by the first part of the duplicated FPs is assumed active as the data segment pointed by the first part of the duplicated FPs is being used in a file system of the storage system.

4. The method of claim 1, wherein the live instance table is stored in a key-value store (KVS), wherein the storage system is a distributed dedupe storage system, and wherein the KVS and the distributed dedupe storage system are operatively connected to each other over a network.

5. The method of claim 4, wherein the L0 segments are data segments of a segment tree, wherein the segment tree is stored to the distributed dedupe storage system, wherein the L0 segments are the lowest level segments in the segment tree, and wherein remaining segments of the segment tree are assigned as metadata segments.

6. The method of claim 5, wherein the metadata segments of the segment tree are stored to the KVS, and wherein a key in the KVS represents a parent segment and a value associated with the key represents a plurality of child segments hosted by the parent segment.

7. The method of claim 1, wherein the container metadata table specifies third FPs that are associated with the set of live CRs, a CID that is associated with the set of live CRs, and a position of each of the set of live CRs in a container that is related to the CID.

8. A non-transitory computer readable medium comprising computer readable program code, which when executed by a computer processor enables the computer processor to perform a method for managing a garbage collection operation in a storage system, the method comprising:

generating a live filter using a Level 1 (L1) table, wherein the L1 table comprises information with respect to Level 0 (L0) segments;

iterating an index table to obtain fingerprints (FPs) of the L0 segments and container identifiers (CIDs) associated with the FPs;

generating a live instance table based on the index table and the live filter, wherein, while the live instance table is being generated, inactive FPs of the FPs or duplicated FPs of the FPs are eliminated and active FPs of the FPs are considered;

iterating the live instance table to count the active FPs for each CID, wherein, in response to counting the active FPs, a reference table is populated to indicate how many of the active FPs are related to each CID;

identifying, based on the reference table and a liveness threshold, a first container that has a low-liveness state and a second container that has a high-liveness state;

assigning the first container to a batch;

identifying FPs of the L0 segments associated with each CID in the batch, wherein the FPs are populated to a hash table;

obtaining metadata of each CID in the batch from a container metadata table;

generating a bitmap based on the hash table and the metadata;

identifying, based on the bitmap, a set of live compression regions (CRs), a set of inactive CRs, a set of live L0 segments within each of the set of live CRs, and a set of inactive L0 segments within each of the set of inactive CRs;

copying forward the set of live L0 segments to newer containers; and deleting containers of the set of inactive L0 segments as part of the garbage collection operation.

9. The non-transitory computer readable medium of claim 8, wherein the inactive FPs are a set of FPs that is not included in the live filter, and wherein an inactive FP of the inactive FPs indicates that a corresponding L0 segment of the L0 segments is not being used in a file system of the storage system.

10. The non-transitory computer readable medium of claim 8, wherein the live instance table comprises a first part of the duplicated FPs that has the highest CIDs, and wherein a data segment pointed by the first part of the duplicated FPs is assumed active as the data segment pointed by the first part of the duplicated FPs is being used in a file system of the storage system.

11. The non-transitory computer readable medium of claim 8, wherein the live instance table is stored in a key-value store (KVS), wherein the storage system is a distributed dedupe storage system, and wherein the KVS and the distributed dedupe storage system are operatively connected to each other over a network.

12. The non-transitory computer readable medium of claim 11, wherein the L0 segments are data segments of a segment tree, wherein the segment tree is stored to the distributed dedupe storage system, wherein the L0 segments are the lowest level segments in the segment tree, and wherein remaining segments of the segment tree are assigned as metadata segments.

13. The non-transitory computer readable medium of claim 12, wherein the metadata segments of the segment tree are stored to the KVS, and wherein a key in the KVS represents a parent segment and a value associated with the key represents a plurality of child segments hosted by the parent segment.

14. The non-transitory computer readable medium of claim 8, wherein the container metadata table specifies third FPs that are associated with the set of live CRs, a CID that is associated with the set of live CRs, and a position of each of the set of live CRs in a container that is related to the CID.

15. A system for managing a garbage collection operation in a storage system, the system comprising:

a processor comprising circuitry;

memory comprising instructions, which when executed by the processor perform a method, the method comprising:

generating a live filter using a Level 1 (L1) table, wherein the L1 table comprises information with respect to Level 0 (L0) segments;

iterating an index table to obtain fingerprints (FPs) of the L0 segments and container identifiers (CIDs) associated with the FPs;

generating a live instance table based on the index table and the live filter, wherein, while the live instance table is being generated, inactive FPs of the FPs or duplicated FPs of the FPs are eliminated and active FPs of the FPs are considered;

iterating the live instance table to count the active FPs for each CID, wherein, in response to counting the active FPs, a reference table is populated to indicate how many of the active FPs are related to each CID;

identifying, based on the reference table and a liveness threshold, a first container that has a low-liveness state and a second container that has a high-liveness state;

assigning the first container to a batch;

identifying FPs of the L0 segments associated with each CID in the batch, wherein the FPs are populated to a hash table;

obtaining metadata of each CID in the batch from a container metadata table;

generating a bitmap based on the hash table and the metadata;

identifying, based on the bitmap, a set of live compression regions (CRs), a set of inactive CRs, a set of live L0 segments within each of the set of live CRs, and a set of inactive L0 segments within each of the set of inactive CRs;

copying forward the set of live L0 segments to newer containers; and deleting containers of the set of inactive L0 segments as part of the garbage collection operation.

16. The system of claim 15, wherein the inactive FPs are a set of FPs that is not included in the live filter, and wherein an inactive FP of the inactive FPs indicates that a corresponding L0 segment of the L0 segments is not being used in a file system of the storage system.

17. The system of claim 15, wherein the live instance table comprises a first part of the duplicated FPs that has the highest CIDs, and wherein a data segment pointed by the first part of the duplicated FPs is assumed active as the data segment pointed by the first part of the duplicated FPs is being used in a file system of the storage system.

18. The system of claim 15, wherein the live instance table is stored in a key-value store (KVS), wherein the storage system is a distributed dedupe storage system, and wherein the KVS and the distributed dedupe storage system are operatively connected to each other over a network.

19. The system of claim 18, wherein the L0 segments are data segments of a segment tree, wherein the segment tree is stored to the distributed dedupe storage system, wherein the L0 segments are the lowest level segments in the segment tree, and wherein remaining segments of the segment tree are assigned as metadata segments.

20. The system of claim 19, wherein the metadata segments of the segment tree are stored to the KVS, and wherein a key in the KVS represents a parent segment and a value associated with the key represents a plurality of child segments hosted by the parent segment.

\* \* \* \* \*